US012580239B2

(12) United States Patent
Park

(10) Patent No.: US 12,580,239 B2
(45) Date of Patent: Mar. 17, 2026

(54) BATTERY RACK AND ENERGY STORAGE SYSTEM

(71) Applicant: LG ENERGY SOLUTION, LTD.,
Seoul (KR)

(72) Inventor: Jun-Cheol Park, Daejeon (KR)

(73) Assignee: LG ENERGY SOLUTION, LTD.,
Seoul (KR)

( * ) Notice: Subject to any disclaimer, the term of this
patent is extended or adjusted under 35
U.S.C. 154(b) by 895 days.

(21) Appl. No.: 17/772,461

(22) PCT Filed: Aug. 19, 2020

(86) PCT No.: PCT/KR2020/011054

§ 371 (c)(1),
(2) Date: Apr. 27, 2022

(87) PCT Pub. No.: WO2021/096034

PCT Pub. Date: May 20, 2021

(65) Prior Publication Data

US 2022/0359922 A1 Nov. 10, 2022

(30) Foreign Application Priority Data

Nov. 14, 2019 (KR) ........................ 10-2019-0146127

(51) Int. Cl.
*H01M 10/48* (2006.01)
*H01M 50/204* (2021.01)
(Continued)

(52) U.S. Cl.
CPC ....... *H01M 10/486* (2013.01); *H01M 50/204*
(2021.01); *H01M 50/244* (2021.01); *H01M*
*50/507* (2021.01)

(58) Field of Classification Search
None
See application file for complete search history.

(56) References Cited

U.S. PATENT DOCUMENTS 6,563,048 B2 * 5/2003 Holt ........................ H02B 1/308
174/50
9,869,726 B2 1/2018 Zumstein et al.
(Continued)

FOREIGN PATENT DOCUMENTS

CN 106340602 A 1/2017
CN 106492376 A 3/2017
(Continued)

OTHER PUBLICATIONS

Extended European Search Report for European Application No.
20887256.4, dated Sep. 23, 2022.
(Continued)

*Primary Examiner* — Amanda J Barrow
(74) *Attorney, Agent, or Firm* — Birch, Stewart, Kolasch
& Birch, LLP

(57) ABSTRACT

A battery rack includes a plurality of battery modules
arranged in a vertical direction, a rack case including a
receiving part having an internal space that is open to a side
to receive each of the plurality of battery modules, and a
movement part configured to discharge the battery module
having a rise in internal temperature above a predetermined
temperature, and a tray configured to receive the discharged
battery module.

11 Claims, 18 Drawing Sheets

(51) Int. Cl.
  *H01M 50/244*  (2021.01)
  *H01M 50/507*  (2021.01)

(56)     References Cited

U.S. PATENT DOCUMENTS

| | | | |
|---|---|---|---|
| 2011/0189511 | A1 | 8/2011 | Yoon |
| 2015/0123468 | A1 | 5/2015 | Wu et al. |
| 2017/0256831 | A1 | 9/2017 | Hong et al. |
| 2017/0324127 | A1 | 11/2017 | Lee et al. |
| 2017/0372578 | A1 | 12/2017 | Klein et al. |
| 2018/0013330 | A1* | 1/2018 | Fang ......................... H02K 7/08 |
| 2019/0305386 | A1* | 10/2019 | Lee ...................... G01R 31/392 |

FOREIGN PATENT DOCUMENTS

| | | | |
|---|---|---|---|
| CN | 107359373 | A | 11/2017 |
| CN | 107681085 | A | 2/2018 |
| CN | 207624752 | U | 7/2018 |
| CN | 207909930 | U | 9/2018 |
| CN | 110247002 | A | 9/2019 |
| CN | 209496011 | U | 10/2019 |
| EP | 3 709 385 | A1 | 9/2020 |
| EP | 3 709 386 | A1 | 9/2020 |
| JP | 2017-502453 | A | 1/2017 |
| KR | 10-1057556 | B1 | 8/2011 |
| KR | 10-2013-0032600 | A | 4/2013 |
| KR | 10-2013-0102976 | A | 9/2013 |
| KR | 10-1652975 | B1 | 9/2016 |
| KR | 10-1706717 | B1 | 3/2017 |
| KR | 10-2017-0047539 | A | 5/2017 |
| KR | 10-1918022 | B1 | 11/2018 |
| KR | 10-2022075 | B1 | 9/2019 |
| KR | 10-2027373 | B1 | 10/2019 |
| KR | 10-2053989 | B1 | 12/2019 |
| WO | WO 2018/085283 | A1 | 5/2019 |
| WO | WO 2019/085274 | A1 | 5/2019 |
| WO | WO 2019/085283 | * | 5/2019 ............... A62C 3/16 |

OTHER PUBLICATIONS

International Search Report for PCT/KR2020/011054 (PCT/ISA/210) mailed on Nov. 25, 2020.

\* cited by examiner

BATTERY RACK AND ENERGY STORAGE SYSTEM

TECHNICAL FIELD

The present disclosure relates to a battery rack having a tray configured to receive a battery module discharged to the outside, and more particularly, to a battery rack for effectively preventing the spread of a fire or heat when the fire or thermal runaway occurs while in use.

The present application claims the benefit of Korean Patent Application No. 10-2019-0146127 filed on Nov. 14, 2019 with the Korean Intellectual Property Office, the disclosure of which is incorporated herein by reference in its entirety.

BACKGROUND ART

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging may be done whenever it is convenient, the self-discharge rate is very low and the energy density is high.

A lithium secondary battery primarily uses lithium-based oxide and a carbon material as a positive electrode active material and a negative electrode active material respectively. The lithium secondary battery includes an electrode assembly including a positive electrode plate and a negative electrode plate coated with the positive electrode active material and the negative electrode active material respectively with a separator interposed between the positive electrode plate and the negative electrode plate, and a packaging or a battery pouch case in which the electrode assembly is hermetically received together with an electrolyte solution.

Recently, secondary batteries are widely used not only in small devices such as portable electronic devices, but also in medium- and large-sized devices such as vehicles and energy storage systems. For use in medium- and large-sized device applications, many secondary batteries are electrically connected to increase the capacity and output. In particular, pouch-type secondary batteries are easy to stack, and due to the advantage, they are widely used in medium- and large-sized devices.

More recently, with the use as a source of energy and the growing need for large-capacity structures, there is an increasing demand for a battery rack including a battery module including a plurality of secondary batteries electrically connected in series and/or in parallel and a battery management system (BMS).

In general, the battery rack includes a rack case made of metal to protect the plurality of battery modules from external impacts or receive and store them. In recent years, with the rising demand for high-capacity battery racks, there is an increasing need for battery racks including a large number of battery modules.

However, the conventional battery rack includes a plurality of battery modules, and when thermal runaway occurs in a secondary battery in any one of the plurality of battery modules, causing a fire or explosion, heat or flames spread to adjacent secondary batteries, causing secondary explosion. Efforts are made to prevent fires or explosions from spreading.

Accordingly, when thermal runaway occurs in a certain secondary battery of the battery rack, quick and perfect fire suppression technology is necessary to take prompt countermeasures.

DISCLOSURE

Technical Problem

The present disclosure is designed to solve the above-described problem, and therefore the present disclosure is directed to providing a battery rack for effectively preventing a fire or heat when the fire or thermal runaway occurs while in use.

These and other objects and advantages of the present disclosure may be understood by the following description, and will be apparent from the embodiments of the present disclosure. In addition, it will be readily appreciated that the objects and advantages of the present disclosure may be realized by means and combinations thereof.

Technical Solution

To achieve the above-described object, a battery rack according to the present disclosure includes a plurality of battery modules arranged in a vertical direction, a rack case including receiving parts having an internal space that is open to a side to receive each of the plurality of battery modules and a movement part configured to discharge a battery module of the plurality of battery modules having a rise in internal temperature above a predetermined temperature, and a tray configured to receive the discharged battery module.

Additionally, the tray may include a cooling material configured to cool the battery module received in the tray.

Additionally, each battery module of the plurality of battery modules may include a temperature sensor to measure a temperature of the battery module, and a module battery management system (BMS) configured to transmit temperature information of the temperature sensor via wireless communication from the module BMS.

Additionally, the rack case may include a rack BMS configured to wirelessly communicate with each module BMS, and the rack BMS may be configured to control the movement part to discharge the battery module when receiving temperature information of the battery module above the predetermined temperature.

Additionally, the movement part may include a wheel configured to rotate to move the battery module to the open side of the receiving part, and an electric motor connected to a rotation axis of the wheel to rotate the wheel.

Additionally, the movement part may include a conveyor belt configured to move the battery module to the open side of the receiving part, and a driving roller to drive the conveyor belt and an electric motor connected to the driving roller.

Additionally, the rack case may be configured to receive the tray in a lower part of the receiving part, and transfer the tray to an outside of the rack case to receive the discharged battery module when the battery module is discharged to the outside.

Additionally, the tray may include a cover member having a movement space configured to guide the fall of the discharged battery module.

Additionally, each battery module of the plurality of battery modules may include a cell assembly including a plurality of secondary batteries, and an external input/output terminal electrically connected to the cell assembly.

Additionally, the battery rack may further include a plurality of module busbars configured to electrically connect the external input/output terminal to the external input/output terminal of other battery module and elastically deform by contact of the external input/output terminal.

Additionally, each external input/output terminal may be respectively interposed between the plurality of module busbars.

Additionally, the battery rack may further include a support configured to fix the plurality of module busbars to an inner surface of the support.

To achieve the above-described object, an energy storage system according to the present disclosure includes at least one battery rack.

Advantageous Effects

According to an aspect of the present disclosure, as the present disclosure includes the rack case including the movement part configured to discharge a battery module having a rise in the internal temperature above the predetermined temperature, some of the plurality of battery modules in which a fire or thermal runaway has occurred may be discharged to the outside, thereby effectively preventing the fire or thermal runaway phenomenon to the adjacent battery module.

In addition, according to an aspect of an embodiment of the present disclosure, the present disclosure includes the rack case including the movement part configured to discharge the battery module having a rise in the internal temperature above the predetermined temperature, and the tray configured to receive the discharged battery module, thereby preventing heat from spreading to the adjacent battery module when a fire or thermal runaway occurs in a battery module. Moreover, as the tray of the present disclosure receives the discharged battery module, it is possible to effectively prevent a fire from spreading to a location adjacent to the rack case. It is possible to increase the safety of the battery rack.

In addition, according to an aspect of the present disclosure, as the battery module of the present disclosure includes the module battery management system (BMS) configured to transmit the temperature information of the temperature sensor to the rack BMS via wireless communication, when compared to the conventional battery module connected to the rack BMS with the sensing wire, the battery module of the present disclosure may be discharged to the outside by the movement part without interruption by the sensing wire. Accordingly, it is possible to stably discharge the battery module in which a fire or thermal runaway has occurred, thereby effectively increasing the safety of the battery rack from the fire.

Further, according to another aspect of the present disclosure, as the movement part of the present disclosure includes the wheel configured to rotate to move the battery module to the open side of the receiving part, and the electric motor connected to the rotation axis of the wheel to rotate the wheel, it is possible to quickly discharge some of the plurality of battery modules in which a fire or thermal runaway has occurred, thereby preventing the fire or thermal runaway from spreading to the adjacent battery module more effectively.

In addition, according to another aspect of the present disclosure, as the movement part of the present disclosure includes the conveyor belt configured to move the battery module to the open side of the receiving part, and the electric motor connected to the driving roller of the conveyor belt that drives the conveyor belt, it is possible to quickly discharge some of the plurality of battery modules in which a fire or thermal runaway has occurred, thereby preventing the fire or thermal runaway from spreading to the adjacent battery module more effectively.

Furthermore, according to an aspect of the present disclosure, as the rack case includes the plurality of module busbars configured to electrically connect the external input/output terminal to the external input/output terminal of other battery module and elastically deform by the contact of the external input/output terminal, and the external input/output terminal interposed between the plurality of module busbars, compared to the external input/output terminal of the conventional battery module joined to the module busbar, the battery module of the present disclosure may be discharged to the outside by the movement part without interruption by the coupling structure with the module busbar. Accordingly, it is possible to stably discharge the battery module in which a fire or thermal runaway has occurred, thereby effectively increasing the safety of the battery rack.

BRIEF DESCRIPTION OF THE DRAWINGS

The accompanying drawings illustrate preferred embodiments of the present disclosure, and together with the following detailed description, serve to provide a further understanding of the technical spirit of the present disclosure. However, the present disclosure is not to be construed as being limited to the drawings.

FIG. 2 is a front perspective view schematically showing the interior of a battery module of a battery rack according to an embodiment of the present disclosure.

FIG. 4 is a perspective view schematically showing a cell assembly of a battery module of a battery rack according to an embodiment of the present disclosure.

FIG. 5 is a front perspective view schematically showing a battery module discharged from a battery rack according to an embodiment of the present disclosure.

Figure 15:
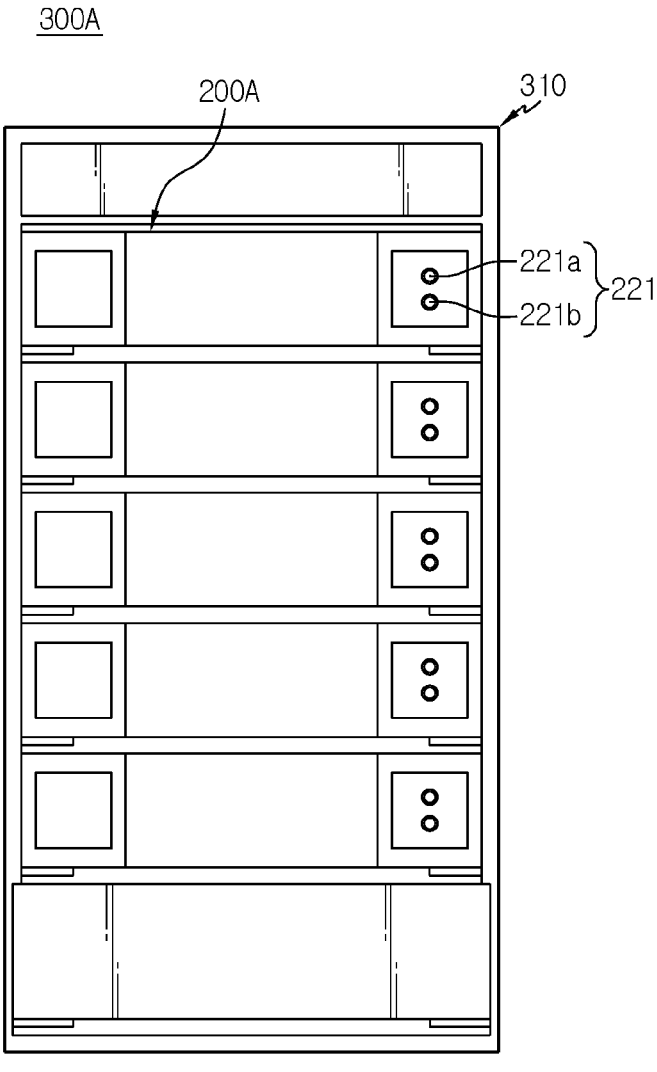

FIG. 15 is a rear view schematically showing a battery rack according to another embodiment of the present disclosure.

Figure 16:
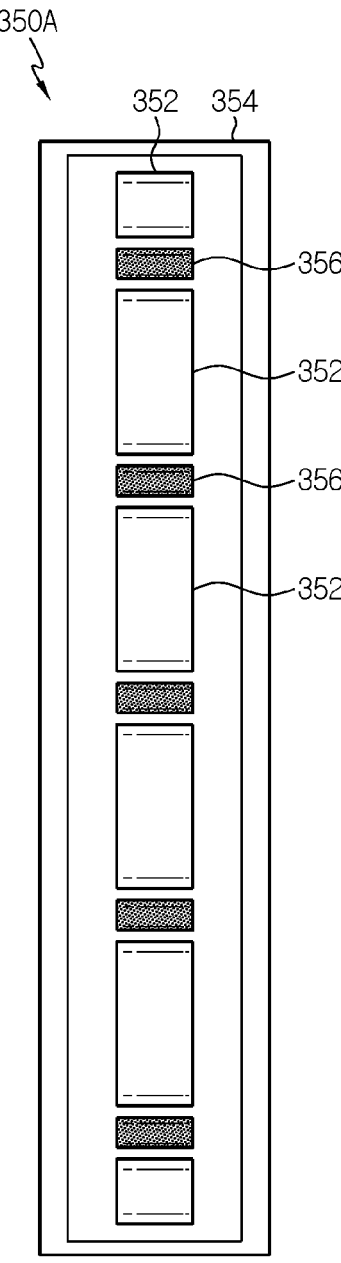

FIG. 16 is a front view schematically showing a module busbar and a support according to another embodiment of the present disclosure.

Figure 17:
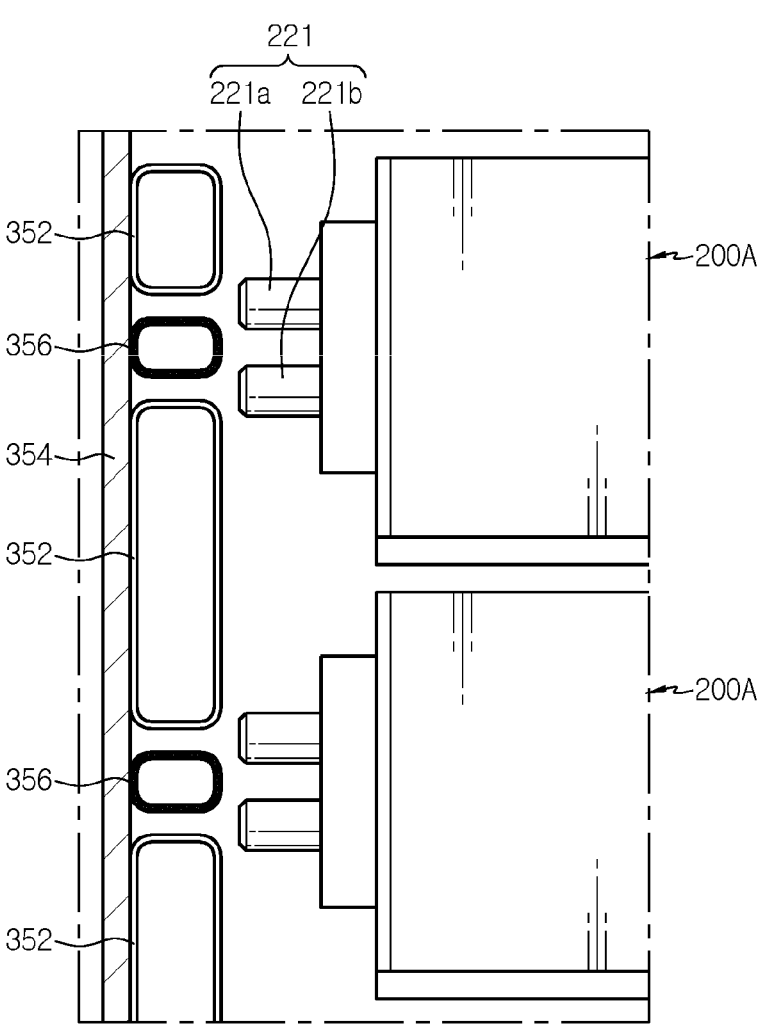
Figure 18:
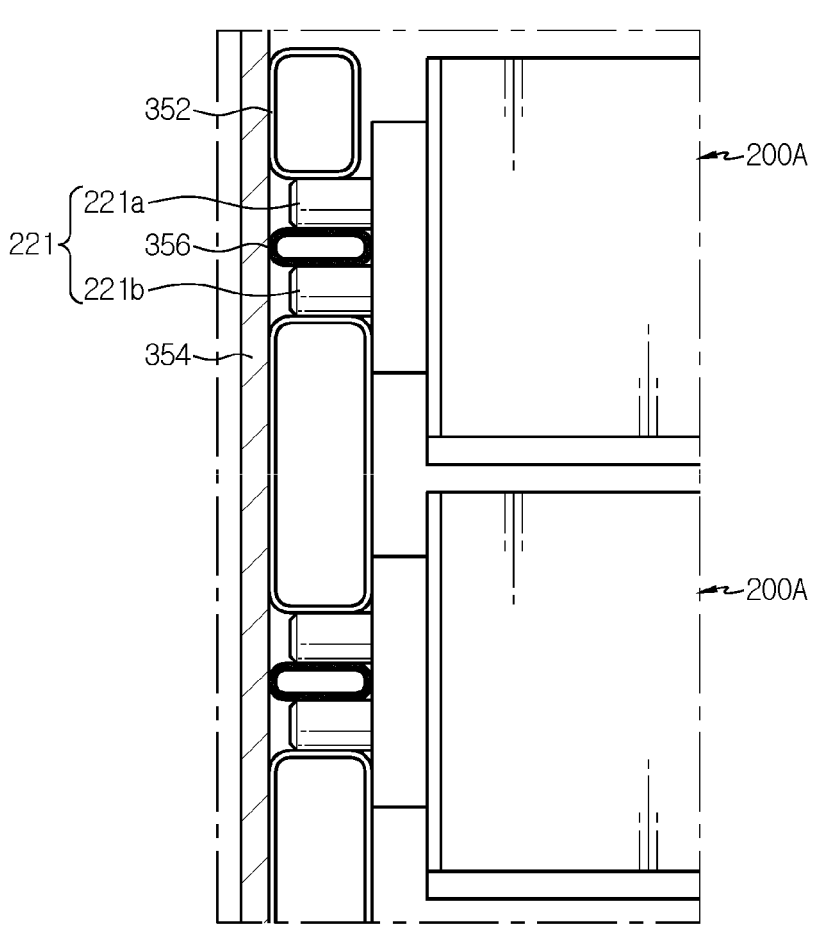

FIGS. 17 and 18 are cross-sectional views schematically showing a process of contact between an external input/output terminal of a battery module and a module busbar according to another embodiment of the present disclosure.

DETAILED DESCRIPTION

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 1:
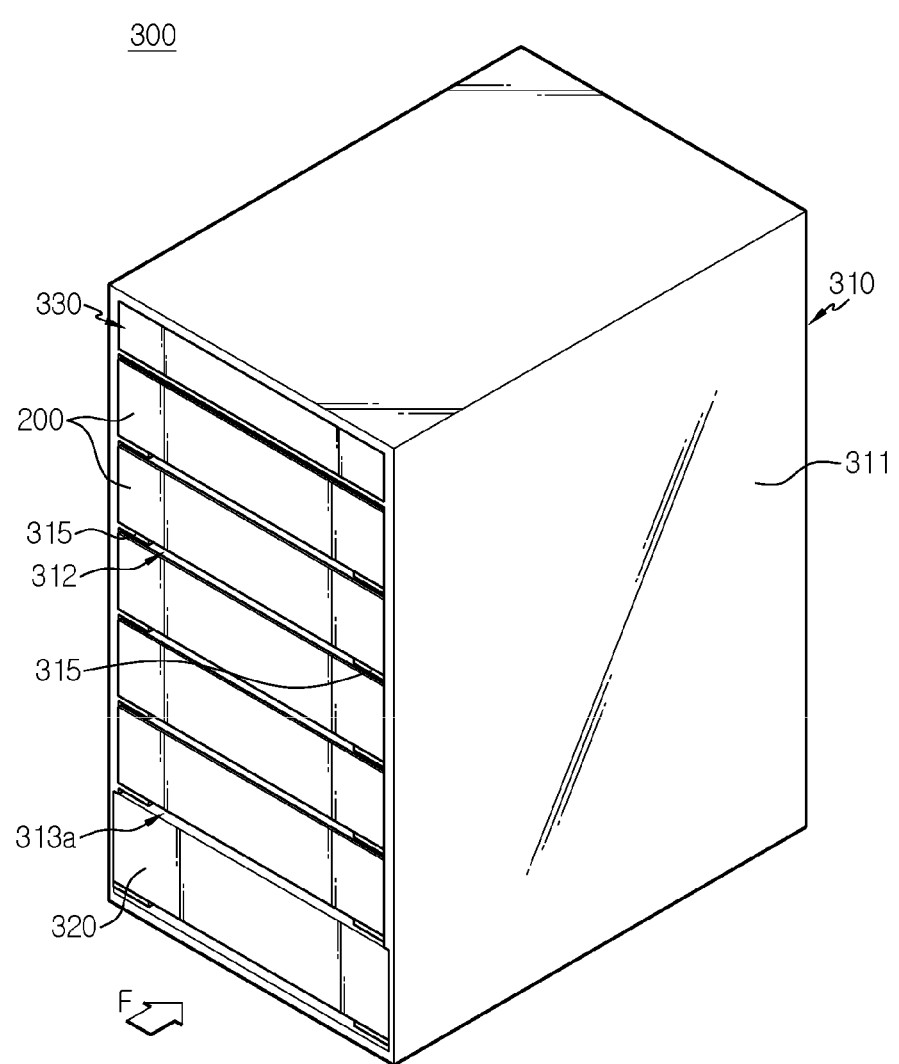
FIG. 1 is a front perspective view schematically showing a battery rack according to an embodiment of the present disclosure.
Figure 2:
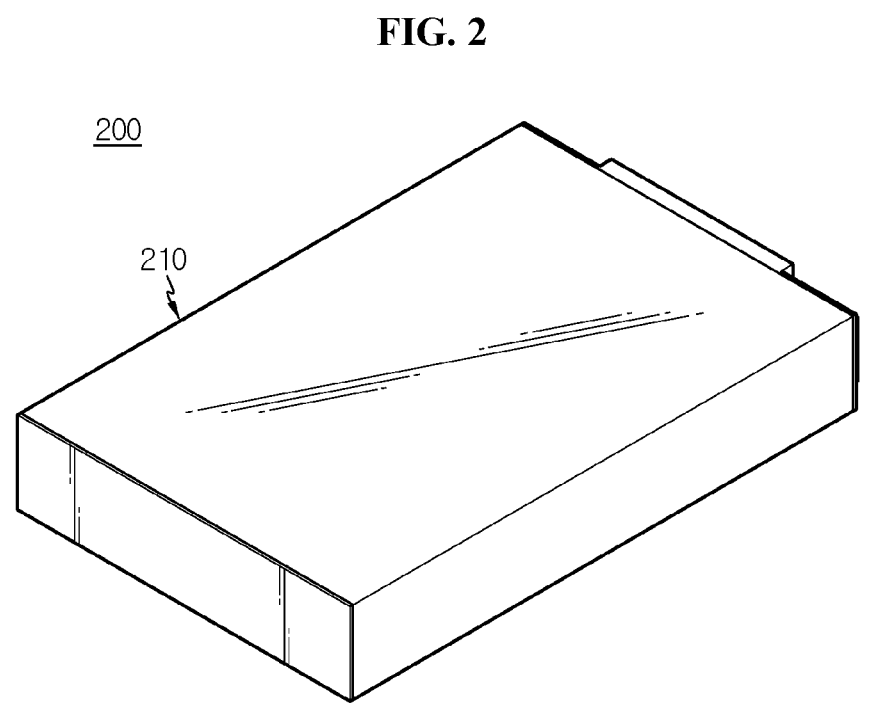
Figure 3:
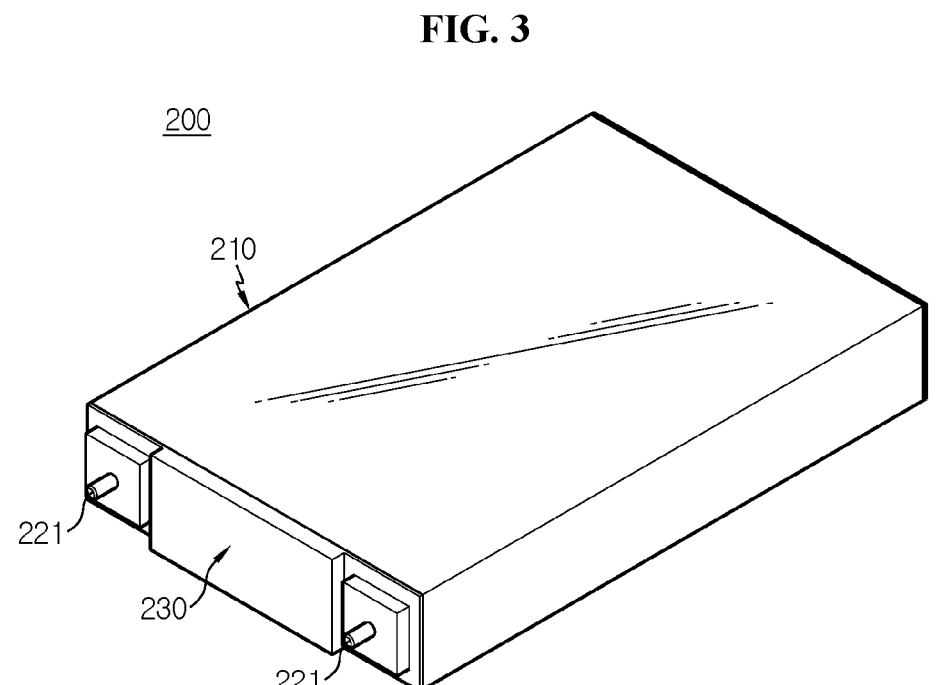
FIG. 3 is a rear perspective view schematically showing a battery module of a battery rack according to an embodiment of the present disclosure.
Figure 4:
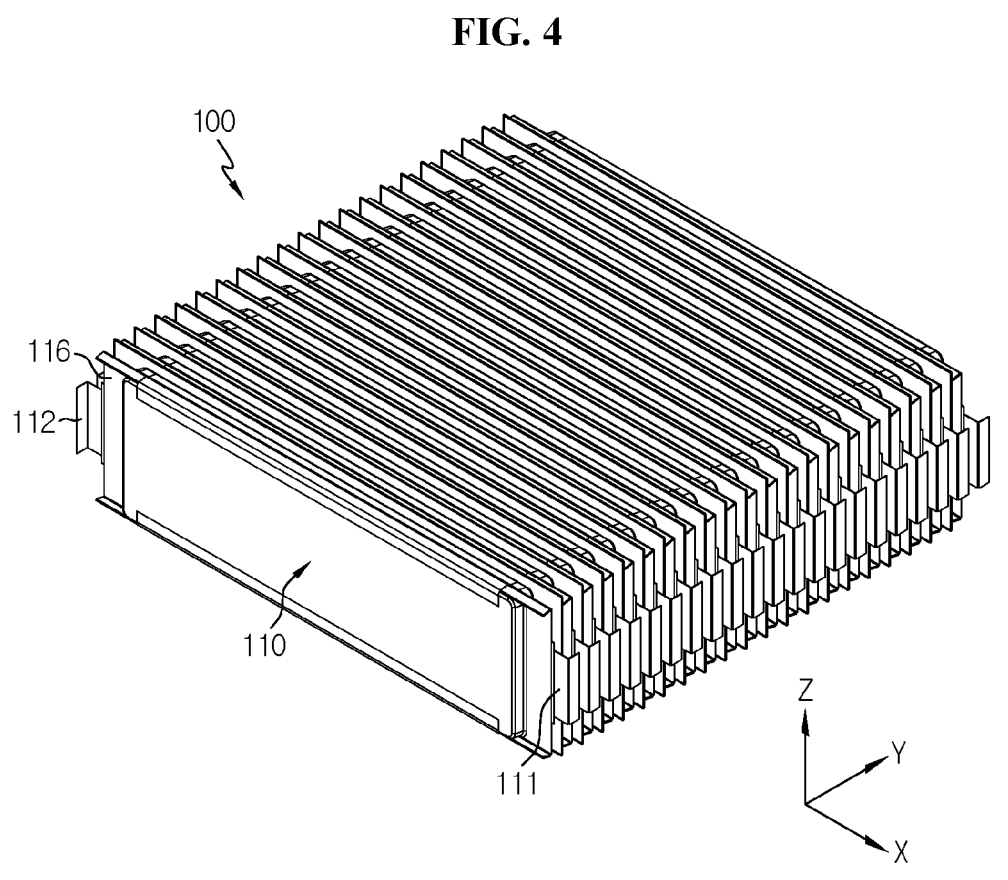

FIG. 1 is a front perspective view schematically showing a battery rack according to an embodiment of the present disclosure. FIG. 2 is a front perspective view schematically showing the interior of a battery module of the battery rack according to an embodiment of the present disclosure. FIG. 3 is a rear perspective view schematically showing the battery module of the battery rack according to an embodiment of the present disclosure. FIG. 4 is a perspective view schematically showing a cell assembly of the battery module of the battery rack according to an embodiment of the present disclosure.

Referring to FIGS. 1 to 4, the battery rack 300 according to an embodiment of the present disclosure includes a plurality of battery modules 200, a rack case 310 and a tray 320.

First, the plurality of battery modules 200 may be received in the rack case 310 in the vertical arrangement. In addition, the plurality of battery modules 200 may include a module housing 210 and a cell assembly 100 having a plurality of secondary batteries 110 provided inside the module housing 210 and stacked in one direction.

Specifically, the secondary battery 110 may be a pouch-type secondary battery 110. For example, as shown in FIG. 4, each of two cell assemblies 100 may include 21 pouch-type secondary batteries 110 stacked side by side in the front-rear direction (Y direction).

In particular, the pouch-type secondary battery 110 may include an electrode assembly (not shown), an electrolyte solution (not shown) and a pouch 116.

Each secondary battery 110 stands in a direction (z direction) perpendicular to the ground with two wide surfaces disposed in the front-rear direction and sealing portions disposed in the up, down, left and right directions, when viewed in the direction F (shown in FIG. 1). In other words, each secondary battery 110 may stand upright in the vertical direction. In the specification, unless otherwise specified, the up, down, front, rear, left, and right directions are defined when viewed from the direction F.

Here, the pouch may have a concave receiving portion. The electrode assembly and the electrolyte solution may be received in the receiving portion. Each pouch may include an outer insulating layer, a metal layer and an inner insulating layer, and the inner adhesive layers adhere to each other at the edges of the pouch to form a sealing portion. A terrace portion may be formed at each of the left and right ends (x direction) at which a positive electrode lead 112 and a negative electrode lead 111 of the secondary battery 110 are formed.

The electrode assembly may be an assembly of an electrode plate coated with an electrode active material and a separator, and may include at least one positive electrode plate and at least one negative electrode plate with the separator. The positive electrode plate of the electrode assembly may have a positive electrode tab, and at least one positive electrode tab may be connected to the positive electrode lead 112.

Here, the positive electrode lead 112 may have one end connected to the positive electrode tab and the other end exposed through the pouch, and the exposed portion may serve as an electrode terminal of the secondary battery 110, for example, a positive electrode terminal of the secondary battery 110.

The negative electrode plate of the electrode assembly may have a negative electrode tab, and at least one negative electrode tab may be connected to the negative electrode lead 111. The negative electrode lead 111 may have one end connected to the negative electrode tab and the other end exposed through the pouch, and the exposed portion may serve as an electrode terminal of the secondary battery 110, for example, a negative electrode terminal of the secondary battery 110.

As shown in FIG. 4, when viewed in the direction F, the positive electrode lead 112 and the negative electrode lead 111 may be formed at the left and right ends in opposite directions (x direction) with respect to the center of the secondary battery 110. That is, the positive electrode lead 112 may be provided at one end (the left end) with respect to the center of the secondary battery 110. The negative electrode lead 111 may be provided at the other end (the right end) with respect to the center of the secondary battery 110.

For example, as shown in FIG. 4, each secondary battery 110 of the cell assembly 100 may have the positive electrode lead 112 and the negative electrode lead 111 extending in the left-right direction.

Here, the terms representing the directions such as front, rear, left, right, up, and down may vary depending on the position of the observer or the placement of the object. However, in the specification, for convenience of description, the directions such as front, rear, left, right, up, and down are defined when viewed from the direction F.

According to this configuration of the present disclosure, it is possible to increase the area of the electrode lead without interference between the positive electrode lead 112 and the negative electrode lead 111 of one secondary battery 110.

The positive electrode lead 112 and the negative electrode lead 111 may be formed in a plate shape. In particular, the positive electrode lead 112 and the negative electrode lead 111 may extend in the horizontal direction (X direction) with the wide surfaces standing upright in the front-rear direction.

Here, the horizontal direction refers to a direction parallel to the ground when the battery module 200 is placed on the ground, and may be referred to as at least one direction on a plane perpendicular to the vertical direction.

However, the battery module 200 according to the present disclosure is not limited to the pouch-type secondary battery 110 described above and may use various types of secondary batteries 110 known at the time of filing the application.

The at least two cell assemblies 100 may be arranged in the front-rear direction.

The battery module 200 may include at least one busbar (not shown) configured to electrically connect the plurality of secondary batteries 110. Specifically, the busbar may include a conductive metal, for example, copper, aluminum and nickel.

According to this configuration of the present disclosure, the module housing 210 has a structure that can stably protect the plurality of secondary batteries 110 from an external impact, thereby increasing the safety of the battery module 200 from an external impact.

Referring back to FIG. 1, the rack case 310 may include a plurality of receiving parts 312 having a receiving space that is open to one side to receive and store each of the plurality of battery modules 200. The plurality of receiving parts 312 may be configured to receive the plurality of battery modules 200 arranged in the vertical direction. The receiving parts 312 may be configured to position the plurality of battery modules 200 at a predetermined interval.

Each of the plurality of receiving parts 312 may include a rack frame 315 on which the battery module 200 is mounted. Specifically, the rack frame 315 may be in the shape of a plate that extends in a direction (horizontal direction) perpendicular to an outer sidewall 311 of the rack case 310. For example, as shown in FIG. 1, the rack frame 315 extending in the front-rear direction may be provided on the left and right sides of five receiving parts 312 configured to respectively receive five battery modules 200 arranged in the vertical direction.

Figure 5:
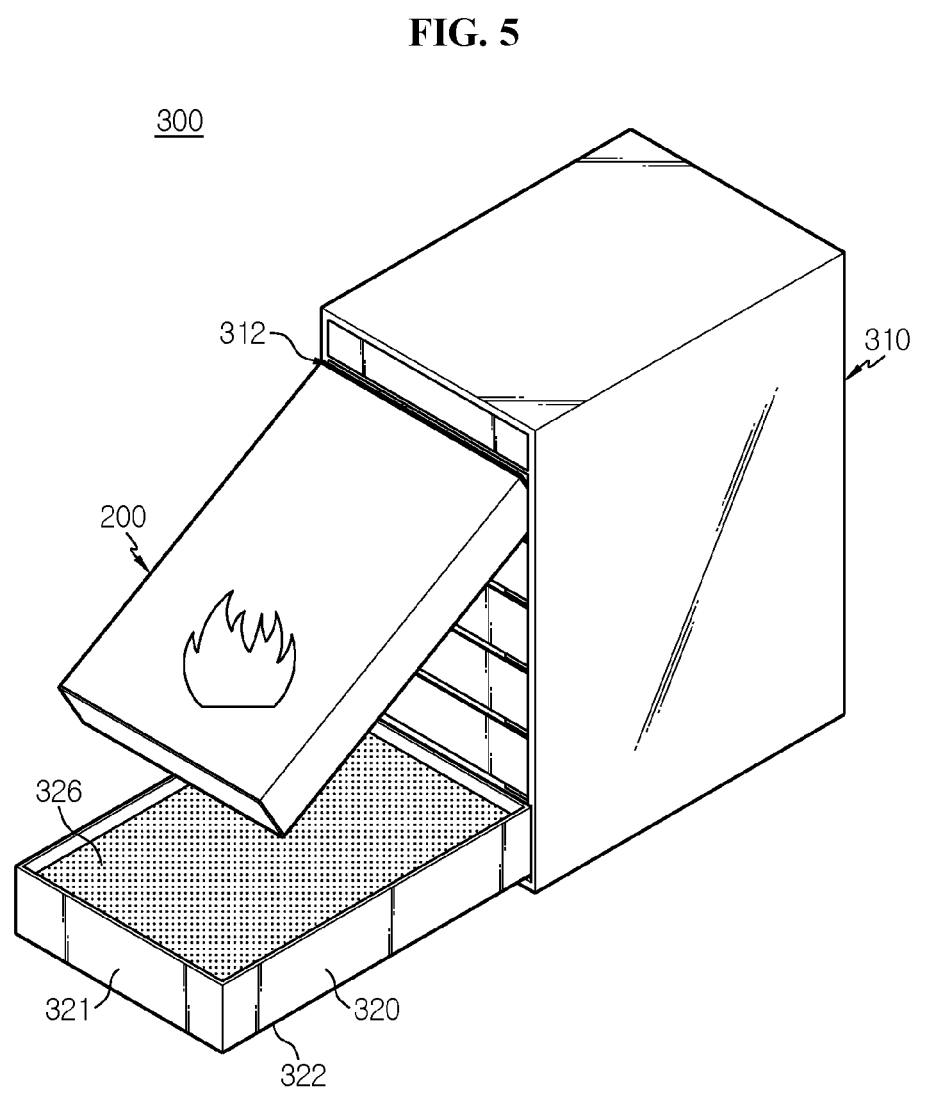
Figure 6:
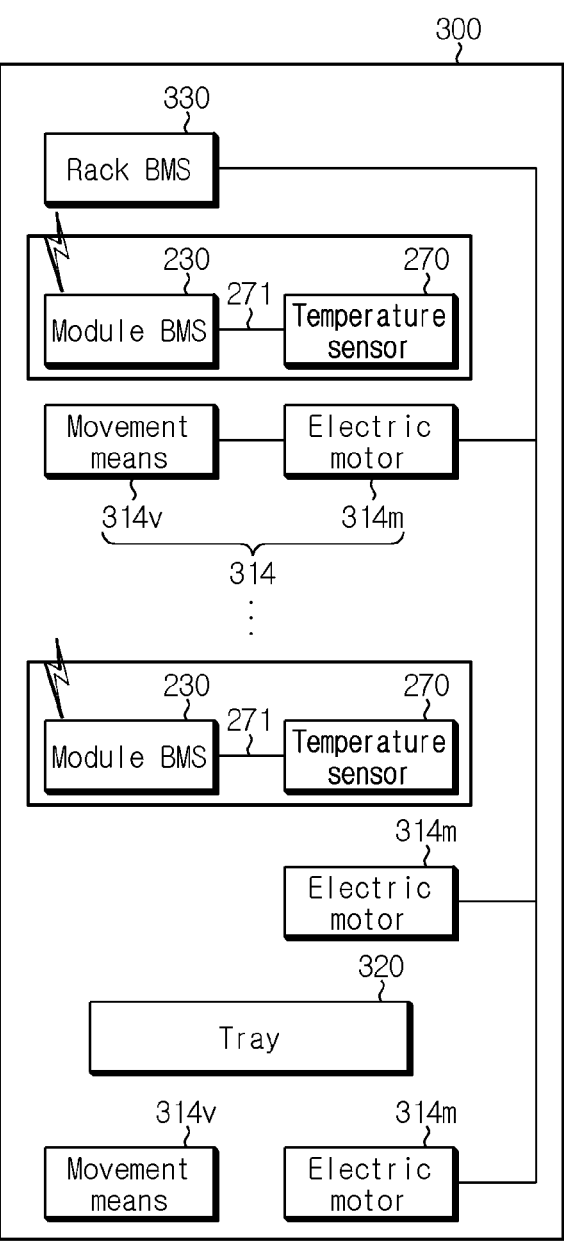
FIG. 6 is a conceptual view of the internal components of a battery rack according to an embodiment of the present disclosure.

FIG. 5 is a front perspective view schematically showing the battery module discharged from the battery rack according to an embodiment of the present disclosure. FIG. 6 is a conceptual view of the internal components of the battery rack according to an embodiment of the present disclosure.

Referring to FIGS. 5 and 6, the rack case 310 may include a movement part 314 including a movement means 314v to discharge the battery module 200 having a rise in the internal temperature above a predetermined temperature. The movement part 314 is configured to discharge the battery module 200 having a rise in the internal temperature above the predetermined temperature due to a fire or thermal runaway by pressing toward the open side (front side) of the receiving parts 312. For example, as shown in FIG. 1, the battery module 200 is received in each of the five receiving parts 312, and when the received battery module 200 rises above the predetermined temperature, the movement part 314 may discharge the battery module 200.

According to this configuration of the present disclosure, the present disclosure includes the rack case 310 including the movement part 314 configured to discharge the battery module 200 having a rise in the internal temperature above the predetermined temperature, so that the battery module 200 in which a fire or thermal runaway occurred among the plurality of battery modules 200 may be discharged, thereby effectively preventing the fire or thermal runaway from spreading to the adjacent battery module 200.

Referring to FIG. 5 along with FIG. 1 again, the tray 320 may be configured to receive the battery module 200 discharged to the outside by the movement part 314. Specifically, the tray 320 may include a base plate 322 having a flat surface extending in the horizontal direction, and a side wall 321 extending up from the outer periphery of the base plate 322. The internal space of the tray 320 may have a size that is large enough to fully receive the battery module 200.

For example, as shown in FIG. 1, the tray 320 may be received in the receiving space 313a formed on the bottom of the rack case 310 before a fire or thermal runaway occurs in the battery module 200. Subsequently, when a fire or thermal runaway occurs in the battery module 200, the tray 320 may be configured to move to a location at which the battery module 200 discharged to the outside by the movement part 314 will fall down. The tray 320 may include a flame-retardant material that does not burn easily. For example, the tray 320 may include a flame retardant plastic. Here, the flame retardant plastic may be a plastic containing a flame retardant (polybrominated diphenylether).

According to this configuration of the present disclosure, the present disclosure includes rack case 310 including the movement part 314 configured to discharge the battery module 200 having a rise in the internal temperature above the predetermined temperature, and the tray 320 configured to receive the battery module 200 discharged to the outside, thereby preventing a fire from spreading the adjacent battery module 200 when the fire or thermal runaway occurs in a battery module 200. Moreover, the tray 320 of the present disclosure receives the discharged battery module 200, thereby effectively preventing the fire from spreading to a location adjacent to the rack case 310. It is possible to increase the safety of the battery rack 300.

Referring back to FIG. 5, the tray 320 may include a cooling member 326 configured to cool the received battery module 200. The cooling member 326 may include water or a filler having high specific heat. For example, the filler may be a solid filler or a liquid filler (for example, an insulating oil such as FR3), which is an insulator having high specific heat. Alternatively, the cooling member 326 may include a phase change material that changes from a solid to a gas or from a liquid to a gas when heated. For example, the phase change material may be paraffin or salt hydrate.

Referring to FIG. 6, the battery module 200 may include a temperature sensor 270 and a module BMS 230. The temperature sensor 270 may be configured to measure the internal temperature of the battery module 200. For example, the temperature sensor 270 may be connected to the module BMS 230 with a sensing wire 271 for communication between the temperature sensor 270 and the module BMS 230. Alternatively, the temperature sensor 270 may be a linear temperature detection sensor. The linear temperature detection sensor may sense the temperature of the plurality of battery modules 200 and may be electrically connected to the module BMS 230 directly without a separate signal wire. Moreover, the linear temperature detection sensor is light and flexible, and thus easy to install. Here, the module BMS 230 may be a battery management system that controls the charge and discharge of the battery module.

The module BMS 230 may be configured to transmit the temperature information of the temperature sensor 270 via wireless communication. To this end, the module BMS 230 may include an NFC wireless communication unit, a Bluetooth wireless communication unit, or an RFID wireless communication unit. The module BMS 230 may be configured to wirelessly communicate with a rack BMS 330 that serves as a central control unit (master) as described below. For example, the module BMS 230 may receive the internal temperature information of the battery module 200 from the temperature sensor 270 and transmit the temperature information to the rack BMS 330 by a wireless communication method. Here, the rack BMS 330 may be a battery management system that controls the charge and discharge of the plurality of battery modules 200 by communication with the plurality of module BMSs 230.

The rack case 310 may include the rack BMS 330 configured to enable wireless communication with the module BMS 230. The rack BMS 330 may include a wireless signal receiver unit (not shown) configured to receive the temperature information from the module BMS 230. In addition, the rack BMS 330 may receive information associated with the current and voltage from the module BMS 230. To this end, the module BMS 230 may further include a printed circuit board (not shown) electrically connected to the cell assembly 100.

When the rack BMS 330 receives the temperature information of the battery module 200 above the predetermined temperature from the module BMS 230, the rack BMS 330 may be configured to control the movement part 314 to discharge the battery module 200. For example, the rack BMS 330 may receive the information associated with the rise in the internal temperature above the predetermined temperature among the plurality of battery modules 200 from the module BMS 230 via wireless communication. Subsequently, the rack BMS 330 may operate the movement part 314 configured to discharge the battery module 200 having a rise in the temperature above the predetermined temperature, to discharge the battery module 200 out of the rack case 310.

According to this configuration of the present disclosure, the battery module 200 includes the module BMS 230 configured to transmit the temperature information of the temperature sensor 270 to the rack BMS 330 via wireless communication, so when compared to the conventional battery module (not shown) connected to the rack BMS with the sensing wire, the battery module 200 of the present disclosure may be discharged to the outside by the movement part 314 without interruption by the sensing wire. Accordingly, it is possible to stably discharge the battery module 200 in which a fire or thermal runaway has occurred, thereby effectively increasing the safety of the battery rack 300.

Figure 7:
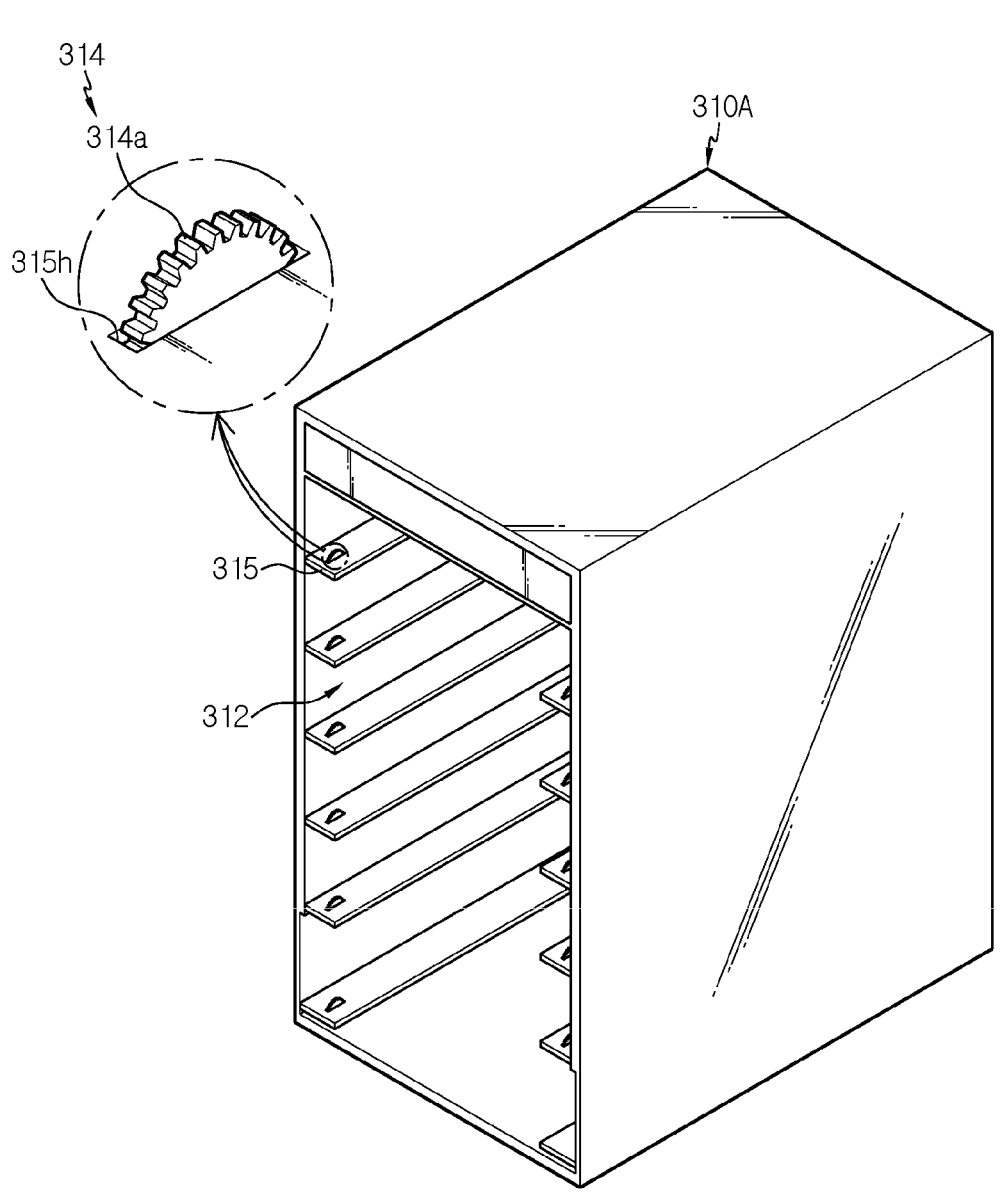
FIG. 7 is a perspective view schematically showing a rack case according to an embodiment of the present disclosure.
Figure 8:
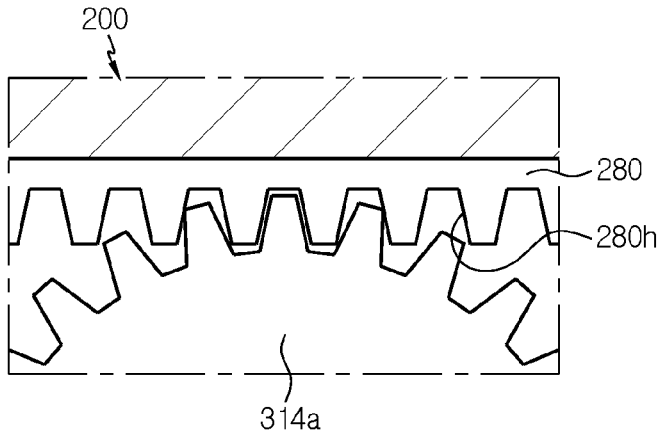
FIG. 8 is a partial side enlarged view schematically showing a wheel and a battery module provided in the rack case of FIG. 7.

FIG. 7 is a perspective view schematically showing the rack case according to an embodiment of the present disclosure. FIG. 8 is a partial side enlarged view schematically showing a wheel and the battery module provided in the rack case of FIG. 7.

Referring to FIGS. 7 and 8 along with FIGS. 1 and 6 again, in the rack case 310A according to an embodiment of the present disclosure, the movement part 314 may include a wheel 314a and an electric motor 314m. Specifically, the wheel 314a may be configured to rotate to move the battery module 200 to the open side of the receiving parts 312. For example, as shown in FIG. 7, the wheel 314a may be inserted and disposed into a part of the rack frame 315. The rack frame 315 may have an opening 315h to allow the wheel 314a to rotate.

The electric motor (314m in FIG. 6) may be connected to the rotation axis of the wheel 314a to rotate the wheel 314a. The electric motor 314m may be electrically connected to the rack BMS 330 to allow the rack BMS 330 to control the rotational movement.

The battery module 200 may include a strap 280 attached to the bottom of the module housing 210. The strap 280 may have a concave and convex structure 280h on the bottom. The wheel 314a may be, for example, teeth. The concave and convex structure 280h of the strap 280 may be engaged with the teeth of the wheel 314a. The strap 280 may be configured to transmit the rotational force of the toothed wheel 314a to the battery module 200 to move the battery module 200 forward.

According to this configuration of the present disclosure, the movement part 314 include the wheel 314a configured to rotate to move the battery module 200 to the open side (front side) of the receiving parts 312 and the electric motor 314m connected to the rotation axis of the wheel 314a to rotate the wheel 314a, to discharge the battery module 200 in which a fire or thermal runaway has occurred among the plurality of battery modules 200, thereby preventing the fire or thermal runaway from spreading to the adjacent battery module 200 more effectively.

Figure 9:
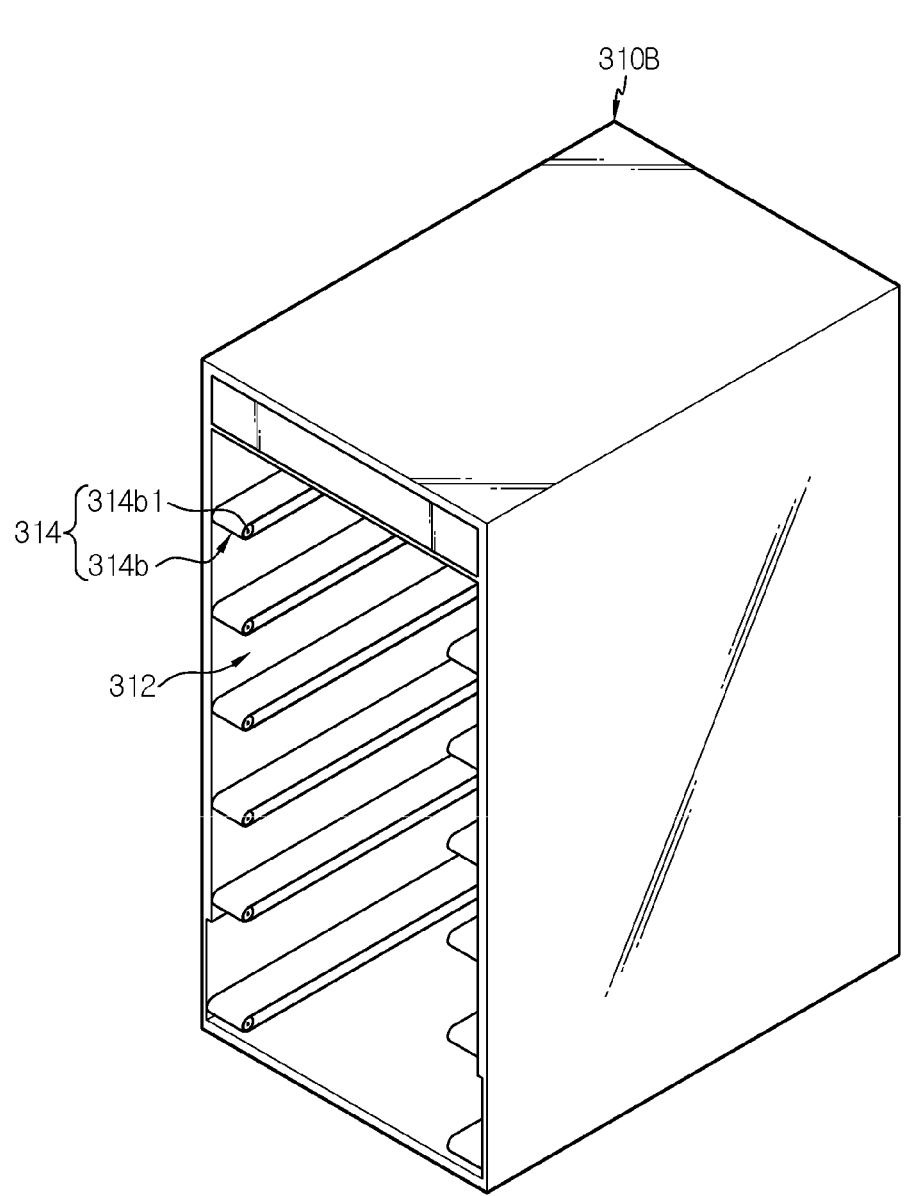
FIG. 9 is a perspective view schematically showing a rack case of a battery module according to another embodiment of the present disclosure.

FIG. 9 is a perspective view schematically showing the rack case of the battery module according to another embodiment of the present disclosure.

Referring to FIG. 9 along with FIGS. 1 and 6 again, in the rack case 310B of the battery module according to another embodiment of the present disclosure, the movement part 314 may include a conveyor belt 314b and the electric motor 314m. The conveyor belt 314b may be configured to move the battery module 200 to the open side of the receiving parts 312. For example, as shown in FIG. 9, the conveyor belt 314b may replace the rack frame of the receiving parts 312. That is, the conveyor belt 314b may be configured to mount the battery module 200 on top. The conveyor belt 314b may include at least one driving roller 314b1. The driving roller 314b1 may be configured to move the belt of the conveyor belt 314b. The electric motor 314m may be connected to the driving roller 314b1 to rotate the driving roller 314b1.

The electric motor (314m in FIG. 6) may be connected to the rotation axis of the driving roller 314b1 to rotate the driving roller 314b1. The electric motor 314m may be electrically connected to the rack BMS 330 to allow the rack BMS 330 to control the rotational movement.

According to this configuration of the present disclosure, the movement part 314 of the present disclosure includes the conveyor belt 314b configured to move the battery module 200 to the open side of the receiving parts 312, and the electric motor 314m connected to the drive roller 314b1 of the conveyor belt 314b to drive the conveyor belt 314b, to rapidly discharge the battery module 200 in which a fire or thermal runaway has occurred among the plurality of battery modules, thereby preventing the fire or thermal runaway from spreading to the adjacent battery module 200 more effectively.

Referring to FIGS. 7 and 9 along with FIG. 5 again, the rack case 310 may be configured to receive the tray 320 in the lower part of the receiving parts 312. For example, as shown in FIG. 7, the receiving space 313a may be provided on the lowermost side of the rack case 310 to receive the tray 320.

When the battery module 200 is discharged to the outside, the rack case 310 may include a transfer means configured to transfer the tray 320 to the outside to receive the discharged battery module 200. For example, as shown in FIG. 7, likewise, the transfer means may include the wheel 314a and the electric motor 314m as described previously. Specifically, the wheel 314a may be disposed in the receiving space on the bottom of the receiving parts 312. For example, as shown in FIG. 7, the wheel 314a may be provided as the transfer means of the tray 320.

The electric motor 314m may be connected to the rotation axis of the wheel 314a to rotate the wheel 314a. The electric motor 314*m* may be electrically connected to the rack BMS 30 to allow the rack BMS 330 to control the rotational movement.

For example, as shown in FIG. 9, the conveyor belt 314*b* and the electric motor 314*m* may be provided as the transfer means of the tray 320. The conveyor belt 314*b* may be configured to move the tray 320 to the open side (front side) of the receiving parts 312. The conveyor belt 314*b* may be configured to mount the tray 320 on top.

The electric motor 314*m* may be connected to the driving roller 314*b*1 to rotate the driving roller 314*b*1 of the conveyor belt 314*b*. The electric motor 314*m* may be electrically connected to the rack BMS 330 to allow the rack BMS 330 to control the rotational movement.

Figure 10:
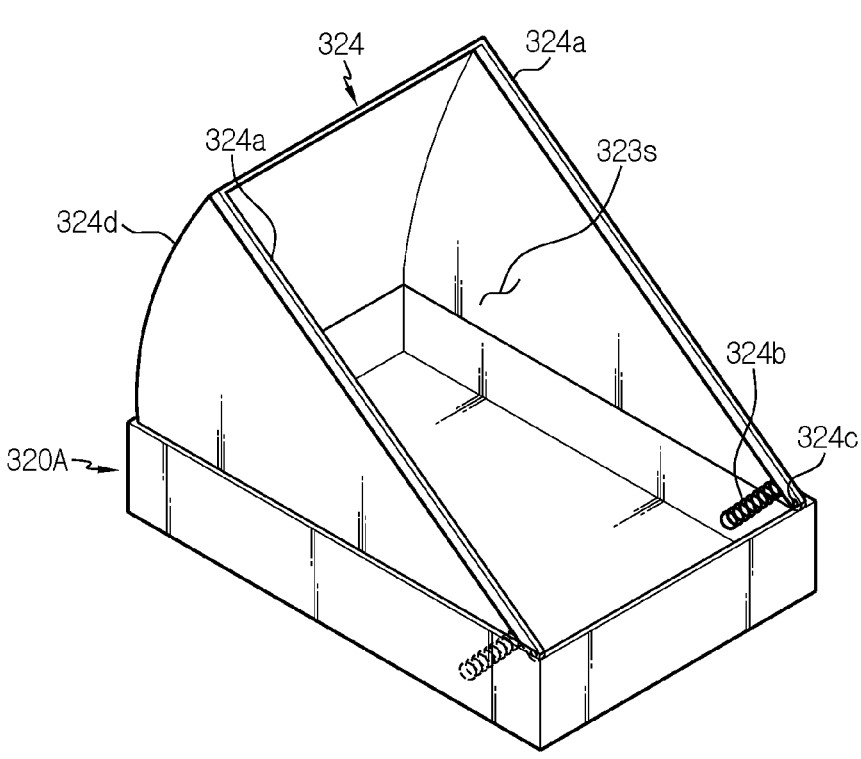
FIG. 10 is a partial perspective view schematically showing a tray of a battery module according to another embodiment of the present disclosure.

FIG. 10 is a partial perspective view schematically showing the tray of the battery module according to another embodiment of the present disclosure.

Referring to FIGS. 1 and 10 along with FIG. 5, the tray 320A according to another embodiment of the present disclosure may include a cover member 324. The cover member 324 may be configured to guide the fall of the battery module 200 discharged to the outside. That is, the cover member 324 may have a movement space 323*s* to make it easy for the battery module 200 to move to a preset location (in the tray) at which the battery module 200 will fall down.

More specifically, the cover member 324 may include a support rod 324*a* and a guide wall 324*d*. The support rod 324*a* may be disposed in the tray 320A in a retracted position when the tray 320A is received in the receiving space (313*a* in FIG. 1) of the rack case 310. Subsequently, when the tray 320A is taken from the receiving space 313*a*, one side of the support rod 324*a* may rotatably move in the upward direction to an extended position by an elastic member 324*b* (for example, a spring) and a hinge structure 324*c*. To this end, the support rod 324*a* may be connected to the tray 320A with the hinge structure 324*c* to make a rotational movement.

The guide wall 324*d* may have the upper end connected to the support rod 324*a* and the lower end connected to the tray 320A so that the guide wall extends between the support rod and the tray. That is, when the tray 320 is disposed in the receiving space 313*a*, the guide wall 324*d* may be received in the tray 320, and subsequently, when the tray 320 is taken out of the tray 320 by the movement means, the guide wall 324*d* may extend up with the upward movement of the support rod 324*a* by the elastic member 324*b*.

The guide wall 324*d* may include a flame retardant material. The movement space 323*s* may be formed by the support rod 324*a* and the guide wall 324*d* connecting the support rod 324*a* to the tray 320A.

According to this configuration of the invention, the tray 320A includes the cover member 324 having the movement space configured to guide the fall of the battery module 200 discharged to the outside, thereby stably receiving the battery module 200 discharged to the outside by the movement part 314 in the tray 320A. It is possible to effectively prevent the spread of a fire from occurring when the battery module 200 in which the fire or thermal runaway has occurred fails to move into the tray 320A.

Figure 11:
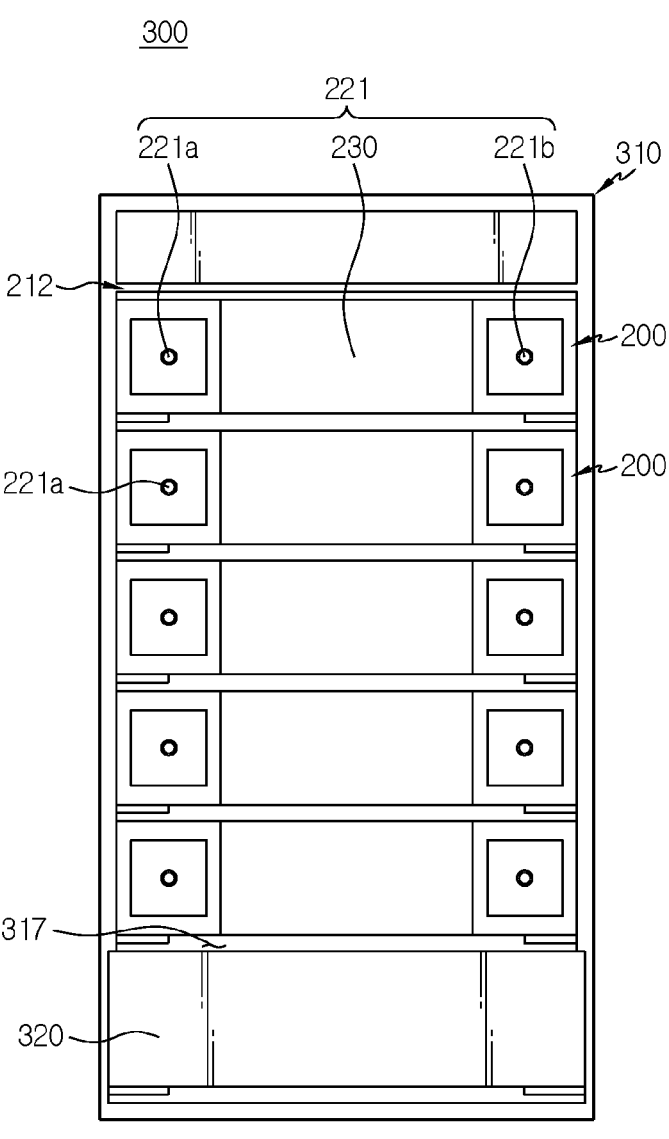
FIG. 11 is a rear view schematically showing a battery rack according to an embodiment of the present disclosure.

FIG. 11 is a rear view schematically showing the battery rack according to an embodiment of the present disclosure.

Referring to FIG. 11, the battery rack 300 according to an embodiment of the present disclosure may include an external input/output terminal 221 in each of the plurality of battery modules 200 received in the receiving parts 212 of the rack case 310. The external input/output terminal 221 may be electrically connected to the cell assembly 100. That is, the battery module 200 may supply power to an external device through the external input/output terminal 221. A positive external input/output terminal 221*a* of the positive electrode may be provided on one side of the rear surface of the battery module 200, and a negative external input/output terminal 221*b* of the negative electrode may be provided on the other side.

Figure 12:
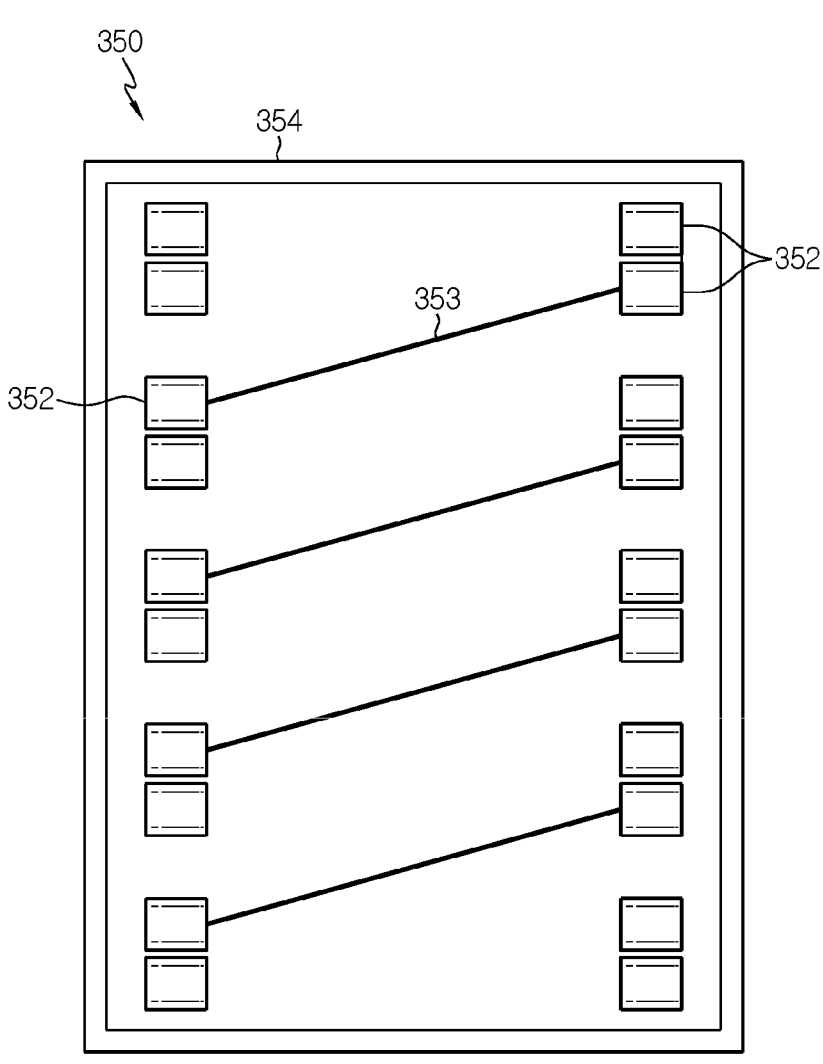
FIG. 12 is a front view schematically showing a module busbar and a support according to an embodiment of the present disclosure.

FIG. 12 is a front view schematically showing the module busbar and the support according to an embodiment of the present disclosure.

Referring to FIG. 12 along with FIG. 11, the battery rack 300 may further include a module connection member 350 configured to electrically connect the plurality of battery modules 200.

The module connection member 350 may include a plurality of module busbars 352. The module busbar 352 may include an electrically conductive metal. For example, the module busbar 352 may include copper, aluminum and nickel.

For example, as shown in FIGS. 11 and 12, the plurality of module busbars 352 may be configured to electrically connect the negative external input/output terminal 221*b* of the battery module 200 to the positive external input/output terminal 221*a* of other battery module 200.

Some of the plurality of module busbars 352 may be electrically connected to each other by a metal wire 353. This is, to electrically connect any one of the plurality of battery modules 200 arranged in the vertical direction to the battery module 200 disposed in the upper or lower position, the module busbar 352 disposed in the upper position and the module busbar 352 disposed in the lower position may be connected with the metal wire 353.

The module connection member 350 may further include a support 354 configured to fix the plurality of module busbars 352 to the inner surface. The support 354 may include a plate that extends vertically and horizontally to fix the plurality of module busbars 352.

Figure 13:
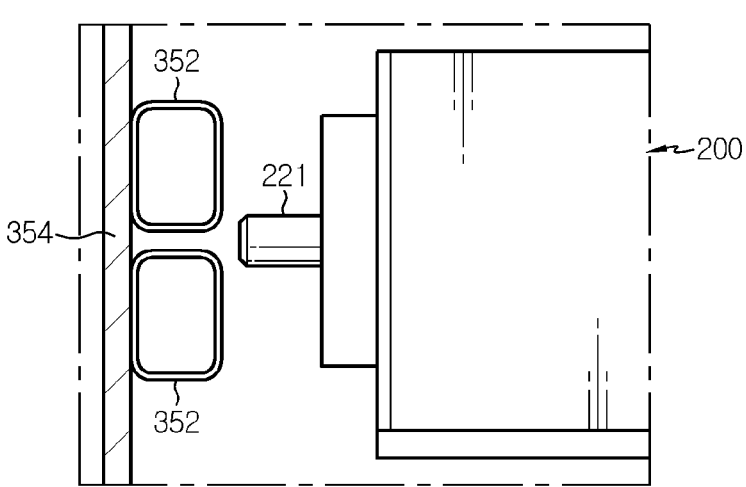
FIGS. 13 and 14 are cross-sectional views schematically showing a process of contact between an external input/ output terminal of a battery module and a module busbar according to an embodiment of the present disclosure.
Figure 14:
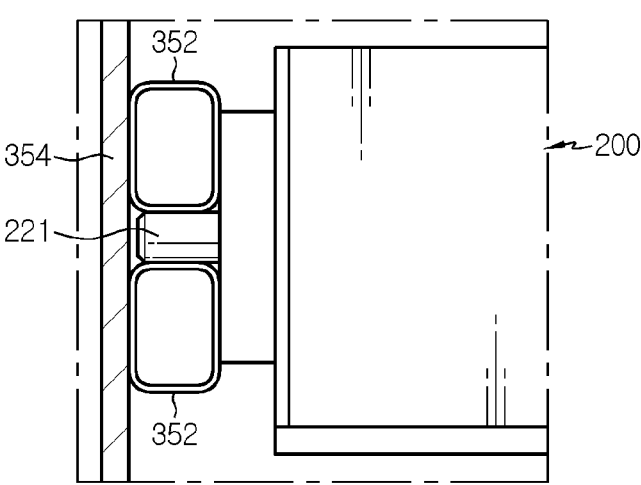

FIGS. 13 and 14 are cross-sectional views schematically showing a process of contact between the external input/output terminal of the battery module and the module busbar according to an embodiment of the present disclosure.

Referring to FIGS. 13 and 14 along with FIGS. 11 and 12, the module busbar 352 may have an elliptical side. In addition, the module busbar 352 may have an oval shape having the upper, lower, front, and rear sides connected to each other. That is, the module busbar 352 may be made in an oval shape having wide surfaces on the upper, lower, front and rear sides by connecting two ends of a strip-shaped thin metal plate extending in a direction.

The external input/output terminal 221 of the battery module 200 may be interposed between the plurality of module busbars 352. In this case, the plurality of module busbars 352 may elastically deform by the contact of the external input/output terminal 221.

Accordingly, as shown in FIG. 14, the external input/output terminal 221 may be interposed between two module busbars 352, and each of the two module busbars may change the shape by the elastic deformation by the contact of the interposed external input/output terminal 221. The two module busbars 352 may elastically press the external input/output terminal 221 to minimize the electrical contact resistance with the external input/output terminal 221 interposed between.

According to this configuration of the present disclosure, the rack case 310 includes the plurality of module busbars 352 configured to electrically connect the external input/ output terminal 221 to the external input/output terminal 221 of other battery module 200 and elastically deform by the contact of the external input/output terminal 221 and the external input/output terminal 221 interposed between the plurality of module busbars 352, so when compared to the external input/output terminal 221 of the conventional battery module 200 joined to the module busbar 352, the battery module 200 of the present disclosure may be discharged by the movement part (314 in FIG. 7) without interruption by the coupling structure with the module busbar 352. Accordingly, it is possible to stably discharge the battery module 200 in which a fire or thermal runaway has occurred, thereby effectively increasing the safety of the battery rack 300. Moreover, the module connection member 350 may easily electrically connect the plurality of battery modules 200 simply when installed on the rear surface of the rack case 310.

FIG. 15 is a rear view schematically showing the battery rack according to another embodiment of the present disclosure.

Referring to FIG. 15, when compared to battery module 200 of FIG. 11, the battery module 200A of the battery rack 300A according to another embodiment of the present disclosure may have the positive external input/output terminal 221a and the negative external input/output terminal 221b arranged in the vertical direction.

For example, as shown in FIG. 15, the positive external input/output terminal 221a and the negative external input/output terminal 221b may be disposed adjacent to each other at the rear end of the battery module 200 mounted on the rack case 310. In this instance, the positive external input/output terminal 221a and the negative external input/output terminal 221b may be arranged in the vertical direction. In addition, all of the plurality of battery modules 200 may include the positive external input/output terminal 221a and the negative external output terminal 221b disposed on the right side with respect to the center, when viewing the battery rack 300A from the rear.

FIG. 16 is a front view schematically showing the module busbar and the support according to another embodiment of the present disclosure. FIGS. 17 and 18 are cross-sectional views schematically showing a process of contact between the external input/output terminal of the battery module and the module busbar according to another embodiment of the present disclosure.

Referring to FIGS. 16 to 18 along with FIG. 15 again, the battery rack 300A according to another embodiment of the present disclosure may include a module connection member 350A configured to electrically connect the plurality of battery modules 200A.

The module connection member 350A may include a plurality of module busbars 352. The module busbar 352 may include an electrically conductive metal. For example, the module busbar 352 may include copper, aluminum and nickel.

The module connection member 350A may include a support part 356 including an electrically insulating material disposed between the plurality of module busbars 352. The electrical insulating material may be, for example, a non-conductive plastic. More specifically, the support part 356 may include polyvinyl chloride or polycarbonate. For example, as shown in FIG. 16, the supporting part 356 including the electrically insulating material may be disposed between the module busbar 352 disposed in the upper position and the module busbar 352 disposed in the lower position.

The support part 356 is spaced apart from the module busbar 352 so that the external input/output terminal 221 is press-fitted in between the module busbar 352 and the support part 356. In this instance, the support part 356 and the module busbar 352 may change the shape by the elastic deformation by the inserted external input/output terminal 221. That is, as shown in FIG. 18, the support part 356 may be interposed between positive external input/output terminal 221a and the negative external input/output terminal 221b to prevent a short circuit between the positive external input/output terminal 221a and the negative external input/output terminal 221b of one battery module 200A.

For example, as shown in FIGS. 17 and 18, the external input/output terminal 221 may be press-fitted or inserted in between the module busbar 352 and the support part 356. The uppermost module busbar 352 and the lowermost module busbar 352 may be electrically connected to the rack BMS (330 in FIG. 1).

For example, as shown in FIGS. 16 and 18, six module busbars 352 may be configured to electrically connect in series the external input/output terminal 221 of the battery module 200A to the external input/output terminal 221 of the other battery module 200A.

The module connection member 350A may include a support 354 configured to fix the plurality of module busbars 352 to the inner surface. The support 354 may be configured to fix the plurality of module busbars 352. For example, as shown in FIG. 16, six module busbars 352 and five support parts 356 disposed between the six module busbars 352 may be fixed to the inner surface of one support 354.

According to this configuration of the present disclosure, the module connection member 350A according to another embodiment includes the plurality of module busbars 352 and the support part 356 disposed between the plurality of module busbars 352, so that the external input/output terminal 221 may be press-fitted or inserted in between the module busbar 352 and the support part 356, and accordingly, the connection operation is easy, the plurality of battery modules 200A may be electrically connected in series, and compared to the external input/output terminal 221 of the conventional battery module 200A joined to the module busbar 352, the battery module 200A of the present disclosure may be discharged by the movement part (314 in FIG. 7) without interruption by the coupling structure with the module busbar 352. Accordingly, it is possible to stably discharge the battery module 200A in which a fire or thermal runaway has occurred.

An energy storage system (not shown) according to the present disclosure may include at least one battery rack 300 according to the present disclosure. In particular, the energy storage system may include a plurality of battery racks 300 according to the present disclosure. The plurality of battery racks 300 may be electrically connected to each other through a rack busbar (not shown). The energy storage system according to the present disclosure may be realized in various forms, for example, a smart grid system or an electric charging station.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

DESCRIPTION OF REFERENCE NUMERALS

300: battery rack
200: battery module
100: cell assembly
110: secondary battery
210: module housing
310: rack case
312: receiving parts
314: movement part
320: tray
326: cooling member
230: module BMS
330: rack BMS
314*a*: wheel
314*m*: electric motor
221: external input/output terminal
314*b*: conveyor belt
314*b*1: driving roller
324: cover member
352: module busbar
354: support

INDUSTRIAL APPLICABILITY

The present disclosure relates to a battery rack. In addition, the present disclosure may be used in the industry of large-scale energy storage systems comprising the battery rack.

What is claimed is:

1. A battery rack comprising:
a plurality of battery modules arranged in a vertical direction;
a rack case including an internal space having an open side to receive each of the plurality of battery modules;
a movement part configured to discharge a first battery module of the plurality of battery modules having a rise in internal temperature above a predetermined temperature; and
a tray configured to receive the first battery module when the first battery module is discharged to outside the rack case, wherein the tray comprises:
a base plate;
a side wall extending upwardly from the base plate; and
a cover member having a guide wall extending upward from the side wall of the tray when the tray is taken out of the rack case and configured to guide a fall of the first battery module when the first battery module is discharged to outside the rack case,
wherein the cover member is configured to rotate from a retracted position to an extended position when the tray is discharged to outside the rack case.

2. The battery rack according to claim 1, wherein the tray includes a cooling material configured to cool the first battery module received in the tray when the first battery module is discharged to outside the rack case.

3. The battery rack according to claim 1, wherein each battery module of the plurality of battery modules includes a temperature sensor to measure a temperature of the battery module, and a module BMS configured to transmit temperature information of the temperature sensor via wireless communication,
wherein the rack case includes a rack BMS configured to wirelessly communicate with each module BMS, and
wherein the rack BMS is configured to control the movement part to discharge the first battery module when receiving the temperature information from the module BMS of the first battery module above the predetermined temperature.

4. The battery rack according to claim 1, wherein the movement part includes:
a wheel configured to rotate to move the first battery module to the open side of the internal space; and
an electric motor connected to a rotation axis of the wheel to rotate the wheel.

5. The battery rack according to claim 1, wherein the movement part includes:
a conveyor belt configured to move the first battery module to the open side of a receiving part;
a driving roller to drive the conveyor belt; and
an electric motor connected to the driving roller.

6. The battery rack according to claim 1, wherein the rack case is configured to: receive the tray in a lower part of the internal space of the rack case, and
further comprises a transfer means to transfer the tray to outside the rack case to receive the first battery module when the first battery module is discharged to the outside.

7. The battery rack according to claim 1, wherein each battery module of the plurality of battery modules includes a cell assembly including a plurality of secondary batteries, and an external input/output terminal electrically connected to the cell assembly,
wherein the battery rack further includes a plurality of module busbars configured to electrically connect the external input/output terminals to each other and elastically deform by contact of the external input/output terminals, and
wherein each external input/output terminal is respectively interposed between the plurality of module busbars.

8. The battery rack according to claim 7, further comprising:
a support configured to fix the plurality of module busbars to an inner surface of the support.

9. An energy storage system comprising at least one battery rack according to claim 1.

10. The battery rack according to claim 1, wherein the cover member comprises:
a support rod capable of rotating between a retracted position and an extended position; and
wherein the guide wall extends between the support rod and the tray.

11. The battery rack according to claim 10, wherein the support rod is connected to the tray to allow a rotational movement.

* * * * *